United States Patent Office 3,555,785
Patented Jan. 19, 1971

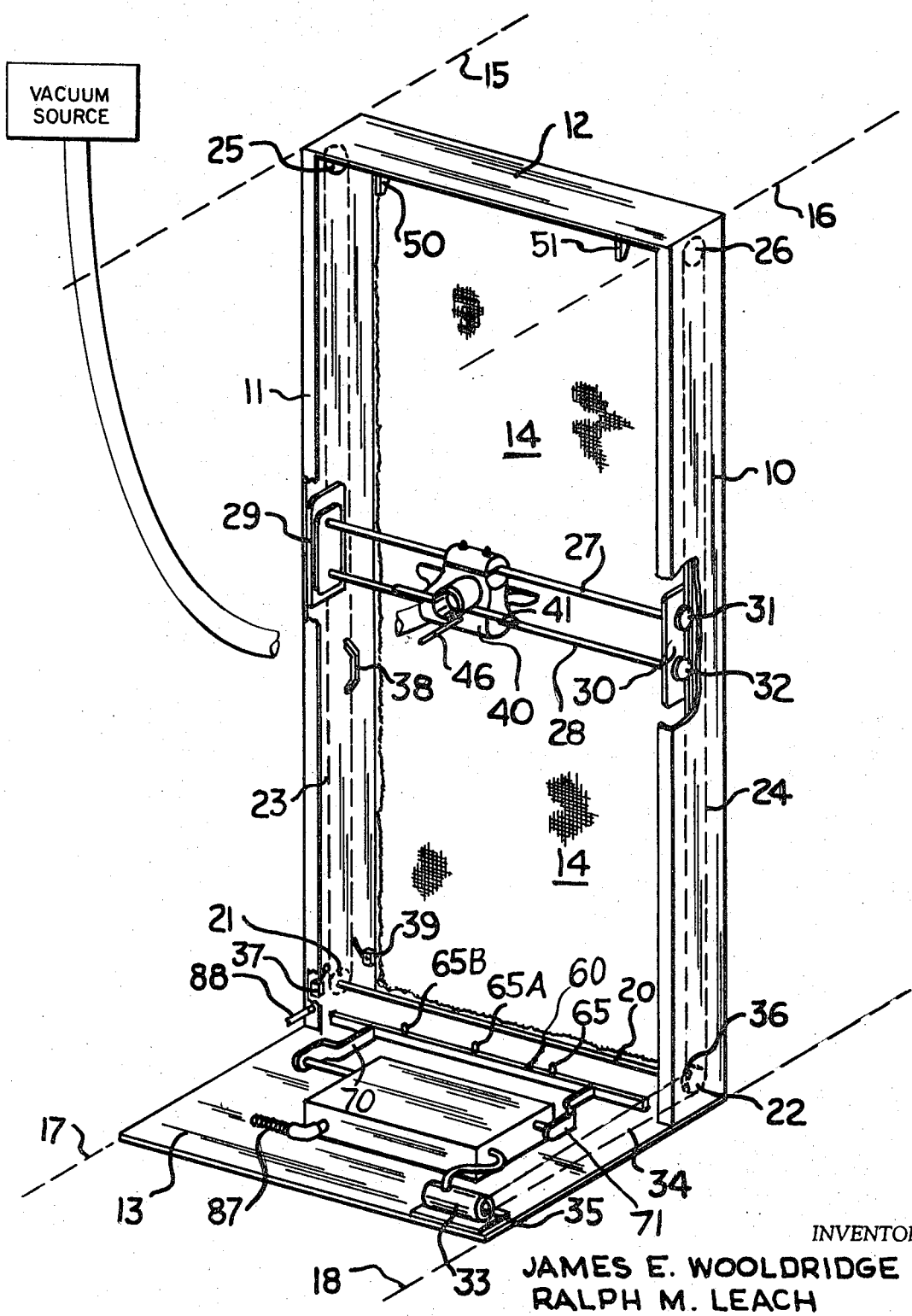

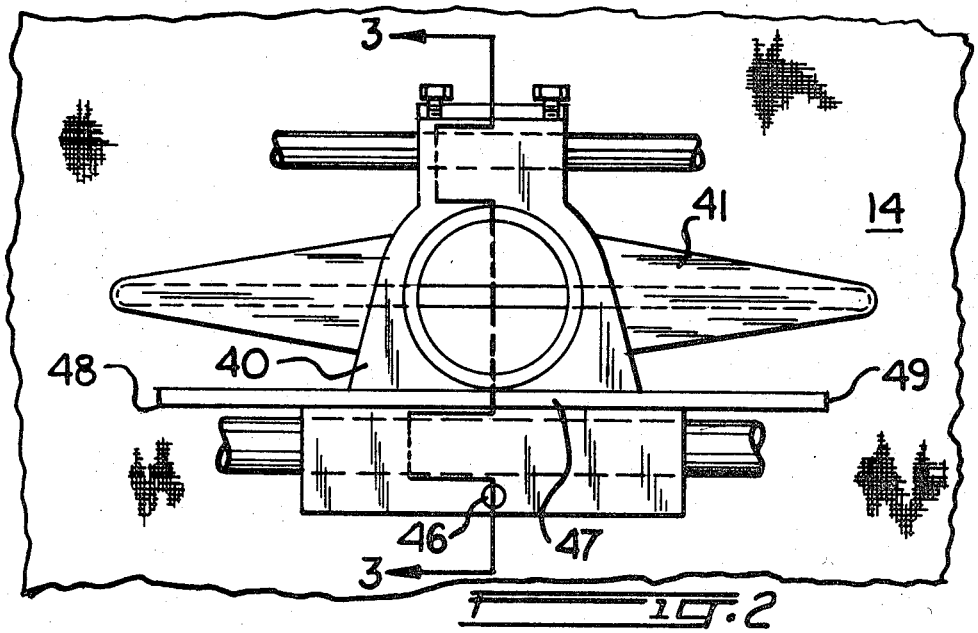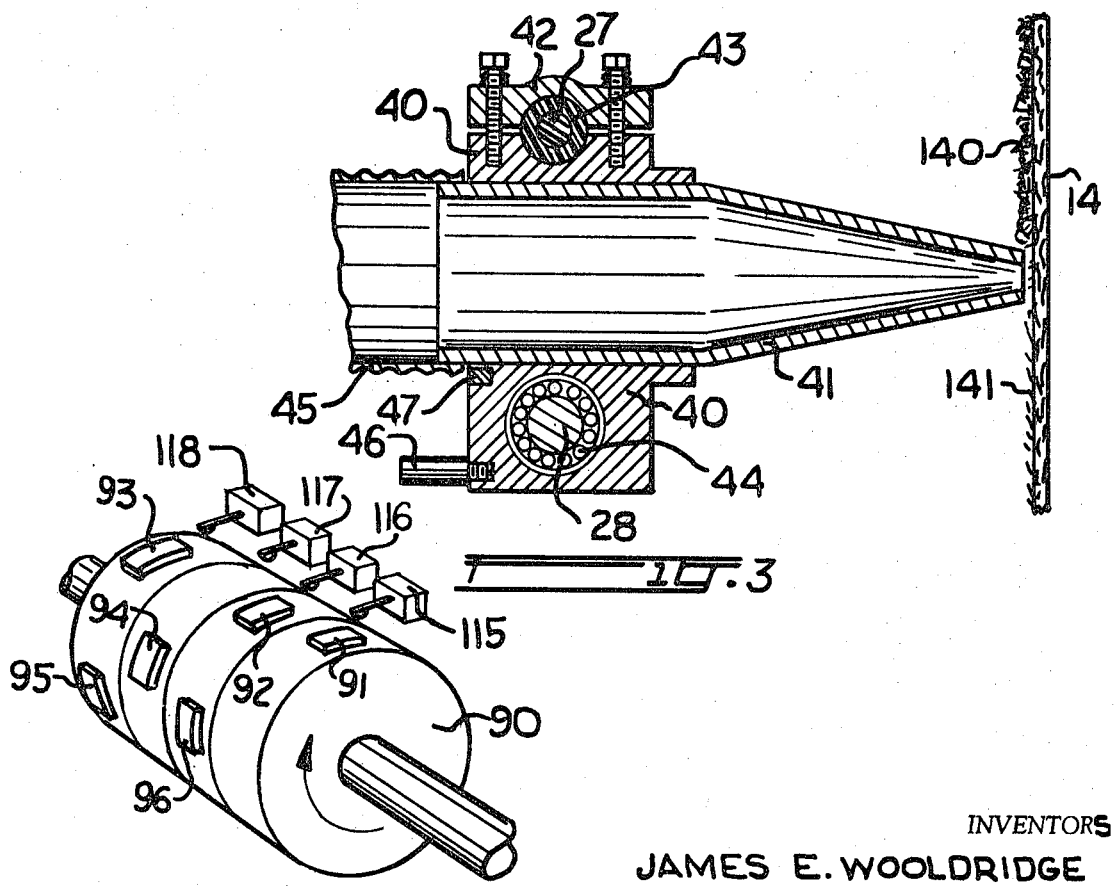

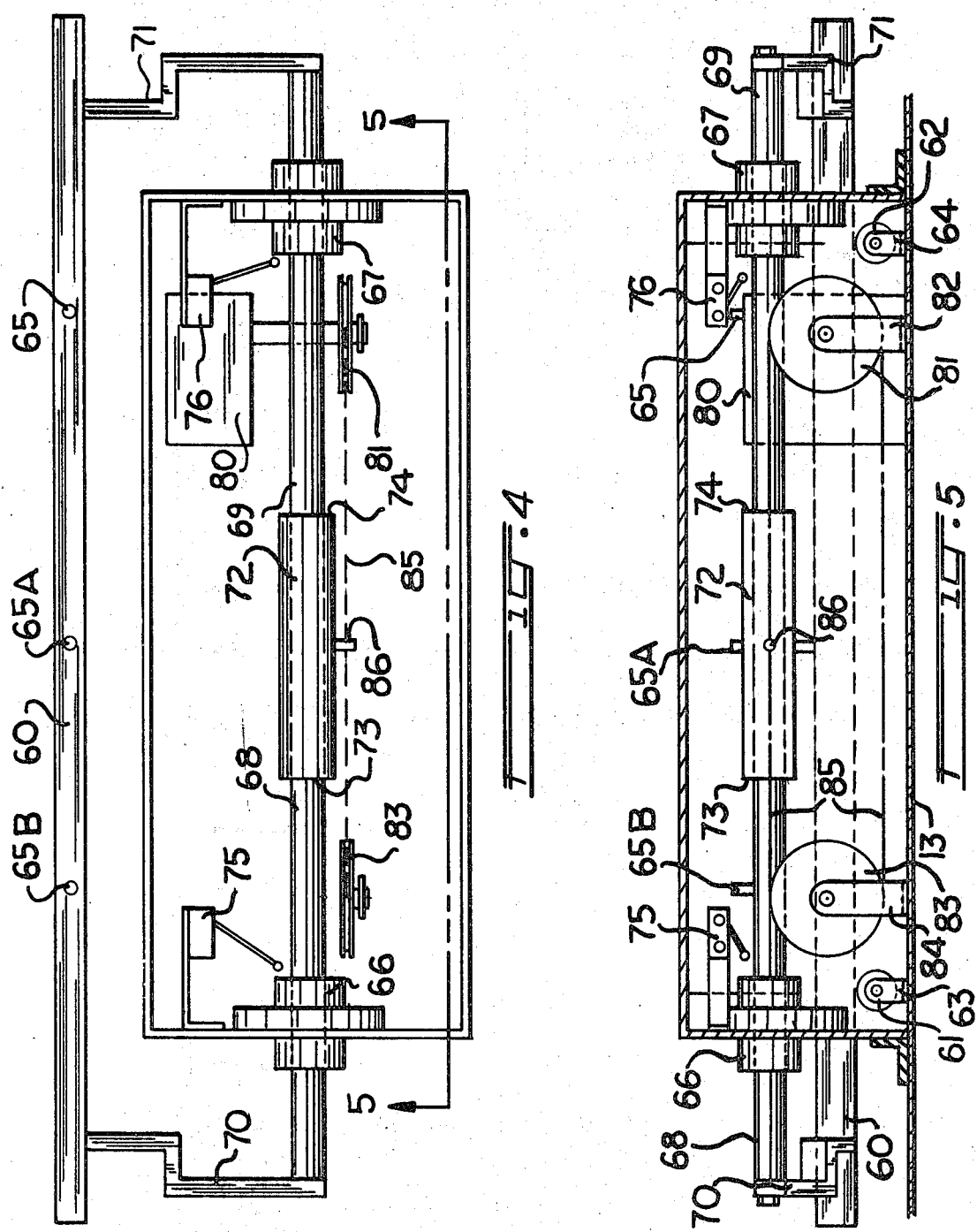

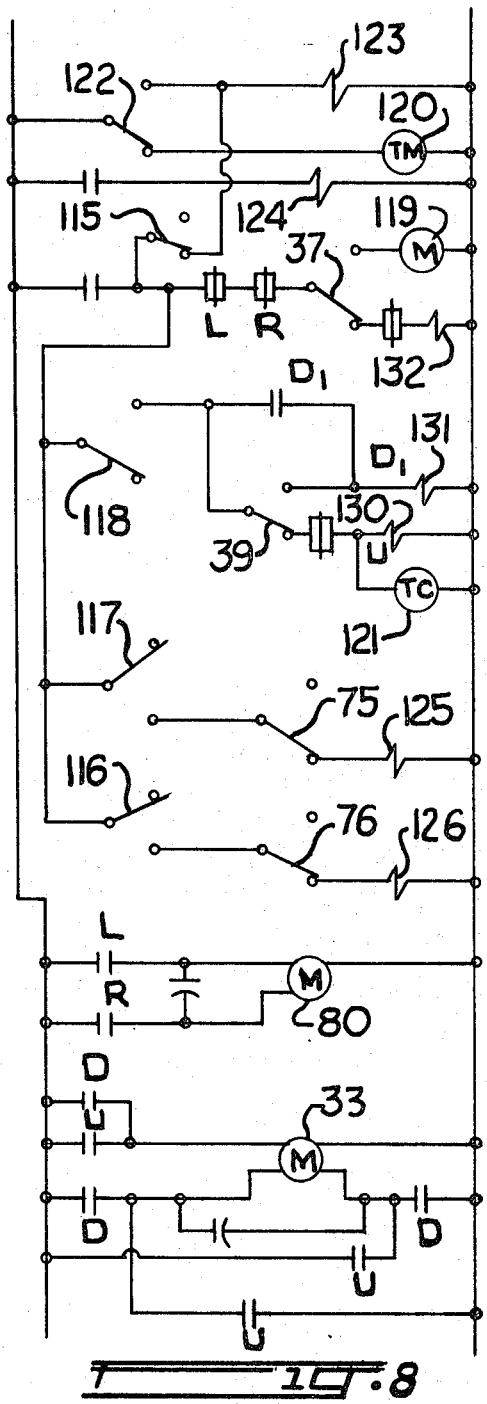

3,555,785
METHOD AND MEANS FOR EFFICIENTLY CLEANING A GAS FILTER
James E. Wooldridge, Louisville, Ky., Ralph M. Leach, Jeffersonville, Ind., and Oscar A. Wurtenberg, Louisville, Ky., assignors, by mesne assignments, to Wehr Corporation, Milwaukee, Wis., a corporation of Wisconsin
Filed Feb. 2, 1968, Ser. No. 702,621
Int. Cl. B01d 46/04
U.S. Cl. 55—96          8 Claims

ABSTRACT OF THE DISCLOSURE

A filter cleaning method and apparatus employing a vacuum cleaning head carried over the filter surface by a reciprocating carriage. The cleaning head is shiftable stepwise along the carriage to predetermined indexed positions during engagement with a shifting means which is detached from the carriage. During each step of its cycle of movement the head makes a passage along the filter from one end of the same to the other end of the filter and back to the first-mentioned end. Remotely controlled means effects the actuation of the shifting means.

BACKGROUND OF THE INVENTION

(1) Field of the invention

Our invention pertains to the art of filtering particulate matter from a gas stream and more especially to the cleaning of a filter surface in an efficient manner by the use of a vacuum cleaning head whose cyclic pattern of movement adjacent the filter surface is automatically controlled. The method and apparatus employed are characterized by the ability to remove from the filter surface various foreign materials deposited thereon by the air stream and of the type which tend to become embedded or entangled on the filter medium, such as lint particles encountered in the filtering of air in textile mills.

(2) Description of the prior art

The conventional methods and apparatus for cleaning stationary gas filter surfaces employ a vacuum cleaning head mounted for controlled movement axially along a travelling carriage which reciprocates between the ends of the filter and with the driving means for such head being mounted upon the carriage. Representative of this conventional equipment is the apparatus disclosed in the patents to Sherrill 3,303,635 and Bratton et al. 3,339,348. We have found that when the controlled stepwise movement of the cleaning head is made dependent upon an actuating means mounted upon such carriage certain resulting limitations upon the cycle of cleaning are then imposed, and complex apparatus for driving the cleaning head and which may malfunction due to collection of foreign material from the air stream thereon, is required. Moreover, in such conventional apparatus mounted in a duct the ratio of filter surface to cross section of such duct is reduced due to the necessity for providing additional space to ensure the actuation of the carriage-mounted driving means for that cleaning head.

It is these and other disadvantages found in the conventional structure of the prior art which it is a purpose of this invention to overcome.

SUMMARY OF THE INVENTION

The cleaning of the filter according to the present invention involves a cycle wherein the cleaning head makes a dual passage over the filter surface during each step of its movement from one side of the filter to the other side thereof. On its first passage the gross amount of foreign material held by the filter medium is removed and the residual amount of such material is loosened and, in the case of lint, is oriented so that on the passage of the head in the opposite direction it may be readily drawn into the nozzle of the vacuum cleaning head. In a given cycle after each dual passage the cleaning head is automatically shifted along a carriage to a distance no greater than the effective cleaning range of that head axially of the carriage whereupon the next dual passage is carried out. Provision is made for a simplified carriage comprising essentially two parallel spaced rods attachable at their ends to the means for propelling the carriage and upon which rods a simplified cleaning head is mounted with the nozzle projecting from between the rods and permitting the carriage to approach closely both of its extreme vertical boundaries of travel.

The means for shifting the cleaning head stepwise of the carriage preferably includes a stationary portion which serves to place that cleaning head at the end of each of the cycles of operation in readiness for engagement by a movable and controllable portion of the shifting means so that each successive cycle of operation begins with the cleaning head resting in the position at which the previous cycle ended.

Objects of the invention include the provision of an improved method of cleaning a gas filter; a novel combination of apparatus for cleaning a gas filter in which a simplified carriage and vacuum cleaning head are employed; an improved movable cleaning head shifting means which is detached from the carriage and is remotely controlled; and an improved assembly of filter cleaning apparatus characterized by its ability to clean a larger ratio of filter surface to cross sectional size of the filter mounting frame.

BRIEF DESCRIPTION OF THE DRAWINGS

The objects of the invention will become more apparent as the description proceeds and when considered in conjunction with the accompanying drawings in which:

FIG. 1 is a perspective view of a filter assembly embodying the invention, with the control panel (not shown) being disposed at a remote location and with a duct being indicated by dotted lines.

FIG. 2 is a rear elevation view of the cleaning head.

FIG. 3 is a sectional view taken on line 3—3 of FIG. 2.

FIG. 4 is a plan view of the cleaning-head-shifting means.

FIG. 5 is a sectional view as taken on line 5—5 of FIG. 4.

FIG. 6 is a perspective view of a control drum for use when an electrical system of activating the cleaning-head-shifting means is employed and with certain switches being shown diagrammatically.

FIG. 7 is a developed view of the control drum showing the relative locations of the cams thereon, and with a chart indicating the stages of a given cycle when the cams actuate certain switches, and FIG. 8 is a wiring diagram indicating the circuits used with the drum of FIG. 6 and the filter cleaning apparatus of FIG. 1.

DESCRIPTION OF THE PREFERRED EMBODIMENT

Referring first to FIG. 1 a generally vertical rectangular frame including side walls 10, 11; a top rail 12; and a flat floor plate 13 to which the lower ends of the side walls are attached serves to support a rectangular sheet of filter medium 14 which may be of any conventional nature as for example a foraminous screen, a natural or synthetic fibre material, a paper material, or the like. This filter sheet extends substantially the entire distance between the side walls of the frame and has its upper and lower edges comparatively close to the upper rail and the floor plate respectively of the frame, when compared with conventional filters. Although the apparatus may be used without a duct upstream of the filter, it is well suited for insertion in a rectangular duct such as indicated by the dotted duct edge lines 15 to 18.

A rotatable shaft 20, the ends of which are journalled in the side walls of the frame closely adjacent the floor plate, carries sprockets 21, 22 around which endless chains 23, 24 are trained and which pass over idler sprockets 25, 26 mounted upon the side walls closely adjacent the upper rail 12 of the frame. Suitably attached at its ends to each of chains 23, 24 is a rigid carriage comprising an upper rod or tube 27 and a parallel lower rod or tube 28 which preferably is of hardened metal. The respective ends of these rods are rigidly affixed to the inner surfaces of guide plates 29, 30. On their outer surfaces these plates mount a pair of spaced rollers, one pair of which is shown at 31, 32, and which are adapted to travel along suitable rails or the like provided by the respective side walls of the frame, or along one edge of the same walls.

One of the guide plates, here shown as plate 29, serves a switch actuating function. Conveniently, as when for reasons of simplicity and compact construction the shaft 20 is driven by a reversible means such as a reversible electric motor 33 through a chain 34 passing over a sprocket 36 on shaft 20, the bottom edge of plate 29 can actuate a down limit switch 37. Moreover, with this arrangement wherein the attachment of the guide plates to their chains are not intended to pass around the sprockets for those chains, a switch actuating means 38 carried by an opposite flight of chain 23 can actuate an up-limit switch 39. Other arrangements with different locations for these switches and with a different mode of actuation may, of course, be used without departing from the invention; as, for example, the use of a unidirectional drive for shaft 20 and the use of pivoted links attaching the guide plates to the respective chains 23, 24, and with such links arranged so that their upper ends would travel with the attached chains around the respective sprockets.

For use with the carriage as described, the invention embodies an improved vacuum cleaning head as best shown in FIGS. 2 and 3 and comprising a yoke member 40 with a central aperture therethrough adapted to hold a cleaning nozzle 41, having an elongated lip opening adapted to travel closely adjacent the surface of the filter medium 14 as shown in FIG. 3. The yoke is provided with upper and lower bores for embracing the respective rods 27, 28, and a spring loaded detachable cap 42 is mounted upon the upper face of the yoke. Packing material 43, such as Teflon braid, is interposed between the yoke and upper rod 27 to provide a braking action, and a ball bearing 44 is interposed between the yoke and lower rod 28. To the rear end of nozzle 41 the customary flexible tubing 45 leading to a source of suction is attached, and foreign material removed from the filter medium is transported through that tubing to any suitable disposal means.

As will now be evident, displacement of the cleaning head axially of the movable carriage can occur only when the head is moved into operative relationship with a head-shifting means which is detached from that carriage. As a significant feature the cleaning head embodies a member such as pin 46 projecting rearwardly from the yoke 40 and adapted to contact a controlled, movable, head-shifting means, serving as an indexing means for such head. The head also carries an elongated bar 47 (FIG. 2) extending axially of the carriage and having end portions 48, 49 adapted to contact stationary cams 50, 51 serving as a supplementary indexing means for the head and extending downwardly from the top rail 12 of the filter frame.

Passing now to FIGS. 4 and 5, the movable head-shifting means comprises an elongated reciprocable bar 60 resting upon rollers 61, 62 which preferably are spring loaded in supporting brackets 63, 64 attached to floor plate 13. Upstanding equally spaced fingers 65 to 65B attached to the bar 60 constitute elements of the head-shifting means which are adapted to contact the pin 46 of the cleaning head when the bar 60 is reciprocated by the control means later to be described. By mounting the bar 60 closely adjacent the floor plate, a maximum length of stroke of the carriage is achieved and the ratio of filter surface to cross section of the duct is increased.

A shallow housing which offers relatively little obstruction to flow toward the filter is attached to floor plate 13, upstream from bar 60, and bushings 66, 67 in its end walls serve to journal for reciprocatory movement a pair of rods 68, 69 which are attached at their outer ends to the bar 60 by means of downwardly sloping connectors 70, 71. These rods at their confronting ends are detachably joined to a stroke limiting member 72 which preferably is of square tubing, and the ends 73, 74 of which will abut against the respective bushings 66, 67 when the bar 60 has moved to its corresponding extreme position. Concurrently with moving to such abutting positions the ends of member 72 are adapted to actuate a corresponding nozzle left stop switch 75 or a corresponding nozzle right stop switch 76, both of which are mounted within the housing.

A reversible drive motor 80 serving as a controlled driving means for effecting the reciprocation of the described head-shifting means also is mounted within the housing and attached to its drive shaft is a sprocket 81 supported by a bracket 82 attached to the floor plate. A similar sprocket 83 serving as an idler is supported by bracket 84 and an endless chain 85 is trained over the sprockets and is attached to member 72 by a suitable pin 86 projecting laterally from that member. Conductors serving the switches 75, 76 and motors 33, 80 enter the housing through a cable 87 and, if desired, a terminal board for the appropriate wiring may also be located within the housing. Conductors serving switches 37, 39 are contained in a cable 88 and each of cables 87, 88 are connected to a control panel which may be located at a remote place where the control drum timer and relays now to be described are positioned.

Referring now to FIGS. 6, 7 and 8 and assuming that a filter about three feet wide and with a cleaning head having a nozzle which requires four separate vertical dual passes over the filter during a cleaning cycle is being used the control drum 90 will be provided with cams 91 to 114 inclusive and which are related to switches 115, 116, 117 and 118 and to events (a) to (r) inclusive. The shaft of this drum is driven by a unidirectional motor 119 under control of a timer motor mechanism 120 including a timer clutch 121 and a switch 122. Conveniently, this mechanism may comprise the Model J3195 timer available from Industrial Timer, Parsippany, N.J. The start of a typical cycle of operation in accordance with the method of the invention may begin, for example, with the carriage at its lowermost position, with the cleaning head disposed a short distance, for example about one inch to the left of the frame side 10, and with the right hand most finger 65 of the bar 60 disposed on the left side of pin 46 of that cleaning head. This described position of the cleaning head is referred to as the first point in its travel.

When, therefore, the motor 120 times to zero, switch 122 is moved to establish a circuit through a blower relay 123 which serves to interrupt the circuit to the timer motor and to start a blower (not shown) applying suction to the cleaning head. In order to enable such blower to reach proper speed before the cleaning head starts to move, a conventional single pole, single throw time delay relay 124 is incorporated in the circuit. After a lapse of, for example, ten seconds the time delay relay contacts close and power is then applied to the drum drive motor 119 through the normally closed contacts of left relay 125 and the normally closed contacts of right relay 126 and through the down limit switch 37 which is closed due to the carriage being in contact therewith. The left and right relays are of a conventional two pole, double throw type.

As the drum 90 then starts to rotate, the cam 91 leaves the cam follower of switch 115 and relay 123 is locked in to continue operation of the blower motor. Immediately cam 92 actuates nozzle right shift switch 116 corresponding to event (b) FIG. 7 and the coil of right relay 126 is energized. When this occurs the contacts of right relay 126 open the circuit to the drum drive motor 119, stopping rotation of the drum and simultaneously establishes a counterclockwise driving circuit through nozzle drive motor 80 causing chain 85 to move stroke limiting member 72 to the right. Movement of member 72 carries the bar 60 with it and the finger 65 being at the left of pin 46 of the cleaning head then pushes the head along the carriage to its right hand most position closely adjacent the wall 10 of the filter frame. When member 72 strikes switch 76 that switch is shifted and the contacts of relay 126 move to their normal position in which the circuit to motor 80 is opened and the circuit to the drum drive motor 119 is reestablished.

As this occurs corresponding to event (c), the cam 93 closes switch 118 and energizes the timer clutch and the up relay 130 which is of the conventional four pole-double throw type, the circuit being made through a normally closed contact of a conventional two pole-double throw auxiliary down relay 131. When the normally open contacts of the up relay 130 close, a circuit is made through drive motor 33 which, through chain 34, rotates shaft 20 and moves the carriage in an upward direction. At the same time the normally closed contacts of up relay 130 open, thus to prevent the main down relay 132, which also is of the four pole-double throw type, from being energized.

As the carriage moves away from its first vertical boundary of carriage movement at the lower end of the filter, the switch 37 shifts and the drum motor 119 stops. Simultaneously, the timer coil 121 resets the timing mechanism and returns switch 122 to its position in which the timer motor is energized. The blower relay 123 is now being held energized through the normally open contacts of relay 124 and the normally closed switch 115.

It will be noted that at this stage of the cycle the bar 60 is still at its righthandmost position, switch 76 is closed and finger 65 is in a plane slightly to the left of the pin 46 of the upwardly travelling cleaning head which is now cleaning foreign material from the filter. When the carriage approaches its second vertical boundary of carriage movement adjacent the top rail of the filter frame, the end 49 of the bar 47 contacts stationary cam 51 and the cleaning head is shifted axially to the left on the carriage sufficient to displace the pin 46 into a plane to the left of the finger 65 of the shift bar 60. Simultaneously the switch actuating means 38 on the chain 23 moves switch 39 to its second position thus deenergizing the up relay 130 and energizing the auxiliary down relay 131. With the consequent opening of the normally open up relay contacts the vertical drive motor 33 is stopped.

Immediately the normally closed contacts of the thus deenergized up relay 130 again close, thus energizing the down relay 132. As this occurs, a circuit is made through motor 33 in a reverse direction and the carriage starts its downward movement. The cleaning head nozzle is slightly displaced from the path which it followed on its upward movement but in general is supplementing the cleaning of that portion of the filter which was partially cleaned on its upward movement, the significance of which will later appear.

Moreover, as the normally open contacts of the auxiliary down relay 131 close, the up limit switch 39 is shunted and relay 131 is held energized. Also the normally closed contacts of relay 131 open and no circuit can be made to up relay 130. Switch 39 is released to its normal first position as the carriage starts downwardly. Upon again approaching its first vertical boundary of carriage movement the carriage actuates switch 37 causing the drum motor 119 to operate and to move cam 94 into contact with the follower of the nozzle left shift switch 117. Prior to the down relay 132 meanwhile is interrupted and the normally open contacts of that relay again open and the vertical drive motor 33 comes to rest.

Actuation of switch 117 corresponding to event (d) occurs while the pin 46 of the cleaning head is resting near shift bar 60 and in a position to the left of finger 65 of that bar. When switch 117 is thus actuated the coil of the left relay 125 is energized through switch 75 and the normally closed contacts of that relay opens thus to stop the drum motor 119. Also the normally open contacts of relay 125 close, thus establishing a circuit through the nozzle drive motor 80 which now turns in a clockwise direction and moves the bar 60 to the left. As bar 60 moves to the left its finger 65 in engagement with pin 46 pushes the cleaning head axially of the carriage to a predetermined position, the packing 43 within the yoke of the head serving to snub any overrun movement of such head. At the properly indexed position for the head the stroke limiting member 72 abuts against bushing 66 and simultaneously actuates switch 75.

This actuation of switch 75 deenergizes left relay 125 whose normally open contacts again open, thus stopping the nozzle drive motor 80. At the same time the normally closed contacts of relay 125 again close and the drum motor 119 is again energized. As the drum rotates, its cams 95 and 96 actuate switches 118 and 116 respectively corresponding to event (e). As will be apparent from the foregoing description with reference to the prior actuation of switch 118 by cam 93, this later actuation of swich 118 will also cause the motor 33 to move the carriage upwardly and to raise pin 46 of the cleaning head above the fingers on the shift bar 60. Moreover, the drum drive motor 119 again is brought to rest until the cleaning head completes its second dual pass up and down the filter surface.

Actuation of switch 116 by cam 96 furthermore causes the shift bar 60 to return to its righthandmost position and to come to rest, thus bringing its intermediate finger 65A into a plane slightly to the right of the pin 46 on the traveling cleaning head. When therefore, event (e) comprising the second dual vertical passage of the cleaning head is completed, drum motor 119 again is energized to cause cam 97 to actuate switch 117 corresponding to event (f). As above described this causes the normally open contacts of relay 125 to close and the normally open contacts of relay 125 to open, thus to actuate the nozzle drive motor 80 and to move bar 60 again to the left. This time however, the intermediate finger 65A of the shift bar engages the pin 46 of the cleaning head and effects the shifting of the cleaning head to the left along the carriage.

After completion of this event (f), the drum motor 119 is again actuated to cause cams 98, 99 to actuate switches 118 and 116 respectively corresponding to event (g) and meanwhile finger 65B of the shift bar 60 is positioned for use in connection with event (h) wherein cam 100 actuates switch 117. During the next event (i) wherein the cleaning head makes its final dual pass along the filter and with cams 101 and 102 actuating switches 118 and 116 respectively, it will be noted that the finger 65B has moved the cleaning head to its extreme left hand position on the carriage prior to the final upward movement of the carriage during the cycle. During such final upward movement of the carriage the end 48 of bar 47 on the cleaning head contacts stationary cam 50 and the cleaning head is shifted a short distance to the right on the carriage thus to enable it to be reengaged by finger 65B at the beginning of the subsequent cycle of cleaning. When the carriage then reaches its first vertical boundary of carriage movement at the end of the described cycle and the drum motor 119 is again energized, cam 103 actuates switch 115 to open the same and the system corresponding to event (j) is inoperative except for the control exerted by timing motor 120. At this time the cleaning head has reached its second point of travel.

As will be understood, the wiring diagram as shown in FIG. 8 is illustrative and may be varied without departing from the invention. Overriding controls such as jog switches, pressure responsive switches, and the like may be employed when desired. For ease in following the circuitry various symbols such as U, D, L, R and $D_1$ are added to indicate contacts of the relays, and capacitors across the lines to motors 33 and 80 are shown.

Referring again to FIG. 7, after the above described cycle of operation is concluded it will be understood that the next cycle will begin with the carriage at its first vertical boundary of carriage movement, with the cleaning head disposed a short distance to the right of frame side 11, and with the finger 65B a shorter distance from the pin 46 of the cleaning head than the full stroke of shift bar 60.

When, therefore, after a lapse of time the timer 120 again operates to energizing drum motor 119, the cam 104 will actuate the nozzle left shift switch 117 and effect an intial left hand movement of shift bar 60 corresponding to event (k) of the second cycle of operations. At this time the cleaning head is moved to its lefthandmost position on the carriage by virtue of the push afforded by finger 65B. When the drum next turns to cause cam 105 to actuate switch 118 corresponding to event (l) the shift bar 60 remains in its lefthandmost position and the carriage starts its upward movement as heretofore described. When the cleaning head approaches the top of the filter the end 48 of bar 47 again contacts the cam 50 and the cleaning head again is shifted a short distance to the right on the carriage. Subsequently when the carriage returns to its first vertical boundary of carriage movement and cam 106 actuates switch 116 corresponding to event (m), the finger 65B engages to the left of pin 46 of the cleaning head and shifts the cleaning head to the right in readiness for the second dual passage of the filter on this subsequent cycle.

In similar manner, the subsequent events (n) to (r) of this second cycle are carried out as the various cams 107 to 114 of the drum are engaged and disengaged from the respective switches. Following event (r) at which time the carriage again is at its first vertical boundary of carriage movement, the cleaning head a short distance to the left of frame side 10, and the finger 65 disposed on the left side of pin 46, the drum 90 will have rotated to bring its cam 91 into contact with switch 115 and the system again comes to rest corresponding to event (a).

With the foregoing disclosure in mind certain advantages of the described method of cleaning a filter and which contribute to an efficient operation will now be apparent. In the cleaning of gases carrying certain foreign material such as lint the material tends to become entangled with the filter medium as shown by the deposit 140 (FIG. 3). With an apparatus of the present construction, as the cleaning head nozzle moves past such a deposit it removes a major portion of the same and in its passage serves to orient or comb and to loosen the residual fibers 141 so that on the subsequent passage in the opposite direction the nozzle can more readily remove that residual material. This dual passage across the filter surface permits a faster movement of the carriage for a given amount of cleaning than if a single passage over the surface were to be made. The location of the nozzle between rods 27, 28 of the cleaning head contributes to a low overall height of carriage, and together with the locating of the cleaning-head-shifting means in detached relation to that carriage permits the nozzle to reach closely adjacent both the upper and the lower ends of the filter sheet which accordingly may be located closely adjacent the upper rail 12 and the floor plate 13 of the frame.

The apparatus is adapted for use with conventional fluid drive motors in lieu of the electrical motors 33, 80 and for the use of conventional valves in a fluid control system in lieu of the electrical switches 37, 39, 75, 76 should it be necessary or desirable to employ the same in an explosion or fire proof installation. As will be understood, the apparatus is not limited to use with any particular width or filter and when the number of stepwise shifts of the cleaning head axially of the carriage is greater or is less than those above described, the drum 90 will be provided with a corresponding greater or lesser number of cams and the shift bar 60 will be provided with a corresponding greater or lesser number of fingers. The length of the shifts of the cleaning head along the carriage may also be changed merely by substitution of a different length of stroke limiting member 72, as shown in FIGS. 4 and 5. However, during each shift of the cleaning head on the carriage, the distance of such shift will be no greater than the width of the nozzle of that head measured transversely of the filter.

The simple construction of the carriage and cleaning head assembly offers practical advantages in that no significant portion of the filter medium is blocked at any time and, since the head shifting mechanism is not carried by that assembly, the chance of malfunction due to collection of foreign material in the assembly is obviated. The degree of braking action afforded by packing material 43 may be readily adjusted merely by adjusting the cap 42 to insure that the cleaning head will remain at its properly indexed position between successive steps of its axial movement on the carriage.

Obviously many modifications and variations of the present invention are possible in the light of the above disclosure. It is, therefore, to be understood that within the scope of the appended claims the invention may be practiced otherwise than as specifically described.

What is claimed is:

1. The method of cleaning a generally rectangular shaped planar gas filter comprising, automatically moving a vacuum cleaning head stepwise transversely of the filter during the cleaning cycle, maintaining said head adjacent and in a plane generally parallel to the upstream face of the filter, the overall transverse movement of said head being from a first point adjacent one corner of the filter to a second point adjacent the opposite corner at the same end of the filter, applying a suction cleaning force to the cleaning head while simultaneously cleaning gas passing through said filter, automatically moving said cleaning head following each transverse step thereof longitudinally across said filter from an adjacent one end of the filter to the other end thereof and back to said one end thereof, bringing the cleaning head to rest upon reaching said second point to complete a cycle of operation, automatically returning said cleaning head after a lapse of time stepwise in similar manner to said first point to effect the next successive cycle of cleaning, and bringing said cleaning head to rest upon reaching said first point at the conclusion of said succeeding cycle of cleaning.

2. A method as defined in claim 1 including, limiting the movement of said cleaning head during each transverse step thereof to a distance no greater than the width of the nozzle of said cleaning head measured transversely of said filter.

3. A filter apparatus including a frame, a planar generally rectangular shaped filter mounted on said frame, a carriage mounted on said frame transversely of said filter and frame, means for reciprocably moving said carriage between a first and lower vertical boundary of carriage movement adjacent the extreme lower end of said filter and a second and upper vertical boundary of carriage movement adjacent the extreme upper end of said filter, a cleaning head reciprocably mounted on said carriage and extending into proximity to said filter, a source of vacuum connected to said head, a head-shifting means mounted adjacent said lower boundary of carriage movement and in detached relation to said carriage, driving means for reciprocating said shifting means in a path transversely of said filter when said carriage is moved adjacent its lower boundary of movement, a member carried by said head for contacting said shifting means, said shifting means including elements arranged to contact said member and to effect shifting of said head transversely of said carriage, and control means for periodically actuating said driving means for reciprocating said shifting means.

4. Apparatus as defined in claim 3 including means for inactivating said carriage moving means during contact of said member with said shifting means.

5. Apparatus as defined in claim 3 including supplementary indexing means mounted on said frame for moving said head into position on said carriage to be engaged by said shifting means prior to beginning a reverse travel movement of said head along said carriage.

6. Apparatus as defined in claim 3 including means for actuating said head-shifting means only after said carriage has travelled from said first to said second boundary and back to said first boundary thereby to effect a dual passage of said head over substantially the same portion of said filter prior to the next subsequent axial shift of said head on said carriage.

7. Apparatus as defined in claim 3 wherein said cleaning-head-shifting means is disposed in spaced relation to said filter upstream from said filter and said member is disposed on the upstream side of said cleaning head.

8. Apparatus as defined in claim 7 wherein said shifting means includes a reciprocable bar extending transversely of said filter and having upwardly extending fingers constituting member-contacting elements spaced therealong, and said member comprises a pin extending toward said bar sufficiently far to be engaged by said fingers.

References Cited

UNITED STATES PATENTS

| | | | |
|---|---|---|---|
| 144,752 | 11/1873 | Fischer | 210—368 |
| 2,584,746 | 2/1952 | Sheldon | 55—294 |
| 2,609,064 | 9/1952 | King, Jr. | 55—272 |
| 3,147,098 | 9/1964 | Honan et al. | 55—294 |
| 3,243,940 | 4/1966 | Larson | 55—396 |
| 3,286,443 | 11/1966 | Wooldridge et al. | 55—271 |
| 3,303,635 | 2/1967 | Sherrill | 55—96 |
| 3,304,571 | 2/1967 | Black, Jr. | 15—312.1 |
| 3,339,348 | 9/1967 | Bratton et al. | 55—294 |
| 3,345,805 | 10/1967 | Sherrill | 55—271 |
| 3,385,033 | 5/1968 | Basore et al. | 55—341 |
| 3,432,877 | 3/1969 | Black, Jr. et al. | 57—56 |

FRANK W. LUTTER, Primary Examiner

B. NOZICK, Assistant Examiner

U.S. Cl. X.R.

55—272, 283, 294, 302